(12) United States Patent
Hampshire et al.

(10) Patent No.: US 11,465,245 B2
(45) Date of Patent: Oct. 11, 2022

(54) TOOLING ASSEMBLY FOR MAGNETICALLY ALIGNING COMPONENTS IN AN ADDITIVE MANUFACTURING MACHINE

(71) Applicant: General Electric Company, Schenectady, NY (US)

(72) Inventors: Joseph Edward Hampshire, West Chester, OH (US); Jinjie Shi, Mason, OH (US)

(73) Assignee: General Electric Company, Schenectady, NY (US)

( * ) Notice: Subject to any disclaimer, the term of this patent is extended or adjusted under 35 U.S.C. 154(b) by 303 days.

(21) Appl. No.: 16/262,031

(22) Filed: Jan. 30, 2019

(65) Prior Publication Data

US 2020/0238448 A1    Jul. 30, 2020

(51) Int. Cl.
| | |
|---|---|
| *B23P 6/00* | (2006.01) |
| *B33Y 10/00* | (2015.01) |
| *B33Y 30/00* | (2015.01) |
| *B33Y 80/00* | (2015.01) |
| *B23K 26/342* | (2014.01) |

(Continued)

(52) U.S. Cl.
CPC .............. *B23P 6/007* (2013.01); *B22F 12/00* (2021.01); *B23K 26/342* (2015.10); *B28B 1/001* (2013.01); *B29C 64/153* (2017.08); *B29C 64/245* (2017.08); *B29C 73/24* (2013.01); *B33Y 10/00* (2014.12); *B33Y 30/00* (2014.12); *B33Y 80/00* (2014.12); *B22F 10/10* (2021.01); *B29L 2031/7504* (2013.01)

(58) Field of Classification Search
CPC .... F05B 2260/302; F03D 80/50; B23P 6/007; B22F 12/00; B22F 5/04; B28B 1/001; B29C 64/153; B29C 64/245
See application file for complete search history.

(56) References Cited

U.S. PATENT DOCUMENTS

| | | |
|---|---|---|
| 2,722,867 A | 11/1955 | Dackor et al. |
| 5,415,384 A | 5/1995 | Obrist et al. |

(Continued)

FOREIGN PATENT DOCUMENTS

| | | |
|---|---|---|
| CN | 105598450 A | 5/2016 |
| CN | 107282923 A | 10/2017 |

(Continued)

OTHER PUBLICATIONS

Mitee-Bite Products, LLC, Workholding Specialists, Aug. 2017 Catalog, 52 Pages.

(Continued)

*Primary Examiner* — Joseph S Del Sole
*Assistant Examiner* — Ariella Machness
(74) *Attorney, Agent, or Firm* — Dority & Manning, P.A.

(57) ABSTRACT

A tooling assembly for mounting a plurality of components, such as compressor blades, in a powder bed additive manufacturing machine to facilitate a repair process is provided. The tooling assembly includes component fixtures configured for receiving each of the compressor blades, a mounting plate for receiving the component fixtures, and a magnet assembly operably coupling the component fixtures to the mounting plate in a desired position and orientation to facilitate an improved printing process.

21 Claims, 8 Drawing Sheets

(51) Int. Cl.

| | | |
|---|---|---|
| *B29C 64/153* | (2017.01) | |
| *B29C 64/245* | (2017.01) | |
| *B28B 1/00* | (2006.01) | |
| *B29C 73/24* | (2006.01) | |
| *B22F 12/00* | (2021.01) | |
| *B29L 31/00* | (2006.01) | |
| *B22F 10/10* | (2021.01) | |

(56) References Cited

U.S. PATENT DOCUMENTS

| | | | |
|---|---|---|---|
| 5,702,574 | A | 12/1997 | Foster et al. |
| 5,810,344 | A | 9/1998 | Nishimoto |
| 5,879,753 | A | 3/1999 | Zajchowski et al. |
| 5,913,555 | A | 6/1999 | Richter et al. |
| 6,161,826 | A | 12/2000 | Forrer |
| 6,401,000 | B1 | 6/2002 | Suzuki et al. |
| 6,435,596 | B1 | 8/2002 | Phillips |
| 6,449,529 | B1 | 9/2002 | Oleksy |
| 6,532,656 | B1 | 3/2003 | Wilkins et al. |
| 6,641,128 | B2 | 11/2003 | Fries |
| 6,895,350 | B2 | 5/2005 | Suzuki et al. |
| 6,908,288 | B2 | 6/2005 | Jackson et al. |
| 6,986,654 | B2 | 1/2006 | Imiolek et al. |
| 6,993,818 | B2 | 2/2006 | Smith et al. |
| 7,009,137 | B2 | 3/2006 | Guo |
| 7,034,246 | B2 | 4/2006 | Muylaert et al. |
| 7,261,550 | B2 | 8/2007 | Herzog |
| 7,357,629 | B2 | 4/2008 | Weiskopf et al. |
| 7,449,658 | B2 | 11/2008 | Mielke |
| 7,520,495 | B2 | 4/2009 | Stark |
| 7,587,818 | B2 | 9/2009 | Gorman et al. |
| 7,665,717 | B2 | 2/2010 | Lenzini |
| 7,674,107 | B2 | 3/2010 | Perret et al. |
| 7,790,096 | B2 | 9/2010 | Merot et al. |
| 8,056,606 | B2 | 11/2011 | Hasz |
| 8,801,502 | B2 | 8/2014 | Ng et al. |
| 8,875,392 | B2 | 11/2014 | Richter |
| 8,920,063 | B1 | 12/2014 | Easley |
| 8,996,156 | B2 | 3/2015 | Melzer-Jokisch et al. |
| 9,073,156 | B2 | 7/2015 | Clark et al. |
| 9,216,484 | B2 | 12/2015 | Bishop et al. |
| 9,283,593 | B2 | 3/2016 | Bruck et al. |
| 9,289,861 | B2 | 3/2016 | Czerner |
| 9,302,359 | B2 | 4/2016 | Hediger |
| 9,435,211 | B2 | 9/2016 | Xu |
| 9,452,474 | B2 | 9/2016 | Xu |
| 9,555,522 | B2 | 1/2017 | Evans et al. |
| 9,884,393 | B2 | 2/2018 | Roberts et al. |
| 9,919,474 | B2 | 3/2018 | Napadensky |
| 9,943,933 | B2 | 4/2018 | Zu et al. |
| 10,035,223 | B2 | 7/2018 | Ladewig et al. |
| 10,086,481 | B2 | 10/2018 | Krol et al. |
| 2002/0104973 | A1 | 8/2002 | Kerekes |
| 2003/0214571 | A1 | 11/2003 | Ishikawa et al. |
| 2004/0191064 | A1 | 9/2004 | Guo |
| 2006/0107610 | A1 | 5/2006 | Boserio |
| 2007/0003416 | A1 | 1/2007 | Bewlay et al. |
| 2007/0077323 | A1 | 4/2007 | Stonesmith et al. |
| 2010/0028158 | A1 | 2/2010 | Richter |
| 2010/0044944 | A1 | 2/2010 | Korn et al. |
| 2012/0076578 | A1 | 3/2012 | Schron, Sr. et al. |
| 2012/0085875 | A1 | 4/2012 | Hoyt et al. |
| 2014/0023426 | A1 | 1/2014 | Schron, Sr. et al. |
| 2014/0163717 | A1 | 6/2014 | Das et al. |
| 2014/0259668 | A1 | 9/2014 | Henderson et al. |
| 2015/0079306 | A1 | 3/2015 | Schoeneborn et al. |
| 2015/0165556 | A1 | 6/2015 | Jones et al. |
| 2015/0224607 | A1 | 8/2015 | Bruck et al. |
| 2015/0336271 | A1 | 11/2015 | Spicer et al. |
| 2016/0023403 | A1 | 1/2016 | Ramos et al. |
| 2016/0069184 | A1 | 3/2016 | Ribic et al. |
| 2016/0074965 | A1 | 3/2016 | Jakimov et al. |
| 2016/0121438 | A1 | 5/2016 | Ladewig et al. |
| 2016/0159011 | A1 | 6/2016 | Marchione et al. |
| 2016/0167172 | A1 | 6/2016 | Goncharov et al. |
| 2016/0250724 | A1 | 9/2016 | Krol et al. |
| 2016/0305777 | A1 | 10/2016 | Racine et al. |
| 2016/0318253 | A1* | 11/2016 | Barnhart .............. B23K 26/342 |
| 2016/0318257 | A1* | 11/2016 | Brooks .................. B29C 73/00 |
| 2017/0009584 | A1 | 1/2017 | Cui et al. |
| 2017/0056975 | A1 | 3/2017 | Carter et al. |
| 2017/0106482 | A1 | 4/2017 | Roberts et al. |
| 2017/0120337 | A1 | 5/2017 | Kanko et al. |
| 2017/0165922 | A1 | 6/2017 | Hakkaku |
| 2017/0259502 | A1 | 9/2017 | Chapiro et al. |
| 2018/0038385 | A1 | 2/2018 | Welch |
| 2018/0056393 | A1 | 3/2018 | Herzog et al. |
| 2018/0079033 | A1 | 3/2018 | Krueger et al. |
| 2018/0111319 | A1 | 4/2018 | Brezoczky et al. |
| 2018/0200800 | A1* | 7/2018 | Hart ........................ B22F 7/08 |
| 2018/0207875 | A1 | 7/2018 | Menchik |
| 2018/0236504 | A1 | 8/2018 | Pourcher et al. |
| 2018/0236556 | A1 | 8/2018 | Garay et al. |
| 2018/0236558 | A1 | 8/2018 | Garay et al. |
| 2018/0238172 | A1 | 8/2018 | Garay et al. |
| 2018/0238173 | A1 | 8/2018 | Garay et al. |
| 2018/0243866 | A1 | 8/2018 | Srinivasan et al. |
| 2018/0333813 | A1 | 11/2018 | Hornbeck |
| 2018/0348367 | A1 | 12/2018 | Crear et al. |
| 2019/0009472 | A1 | 1/2019 | Mark |
| 2019/0015899 | A1 | 1/2019 | Chaput et al. |
| 2019/0022760 | A1 | 1/2019 | Coskun et al. |
| 2019/0060998 | A1 | 2/2019 | Kelkar et al. |
| 2019/0072933 | A1 | 3/2019 | Wu et al. |
| 2019/0077078 | A1* | 3/2019 | Hsieh .................... B33Y 30/00 |
| 2019/0160734 | A1* | 5/2019 | Biesboer ................ C08L 33/08 |
| 2019/0358755 | A1 | 11/2019 | Ott |

FOREIGN PATENT DOCUMENTS

| | | | |
|---|---|---|---|
| DE | 29907262 U1 | 7/1999 | |
| DE | 102011102543 A1 | 11/2012 | |
| DE | 102010001414 B4 | 5/2013 | |
| DE | 102012011217 A1 * | 12/2013 | .............. B22F 10/40 |
| DE | 102012011217 A1 | 12/2013 | |
| DE | 102013213260 A1 | 1/2015 | |
| DE | 102017201994 A1 | 8/2018 | |
| DE | 102018112248 A1 | 12/2018 | |
| EP | 1637274 A1 | 3/2006 | |
| EP | 2848335 A1 | 3/2015 | |
| EP | 3023177 A1 | 5/2016 | |
| EP | 3159080 A1 | 4/2017 | |
| EP | 3450058 A1 | 3/2019 | |
| FR | 3054799 A1 | 2/2018 | |
| GB | 2181374 A | 4/1987 | |
| GB | 2453945 | 4/2009 | |
| JP | 2009/056511 A | 3/2009 | |
| JP | 2010/120104 A | 6/2010 | |
| JP | 2016/532586 A | 10/2016 | |
| JP | 2017/217674 A | 12/2017 | |
| JP | 2018/001723 A | 1/2018 | |
| WO | WO2015/092442 A1 | 6/2015 | |
| WO | WO2015118180 A1 | 8/2015 | |
| WO | WO2016/075802 A1 | 5/2016 | |
| WO | WO2017074373 A1 | 5/2017 | |
| WO | WO2017/100695 A1 | 6/2017 | |
| WO | WO2018//145912 A1 | 8/2018 | |
| WO | WO2018145912 A1 | 8/2018 | |

OTHER PUBLICATIONS

Jones et al., Remanufacture of turbine blades by laser cladding, machining and in-process scanning in a single machine, Proceedings from 23$^{rd}$ Annual International Solid Freeform Fabrication Symposium, Aug. 16, 2012, pp. 821-827.

Peng et al., Influence of Energy Density on Energy Demand and Porosity of 316L Stainless Steel Fabricated by Selective Laser Melting, International Journal of Precision Engineering and Manufacturing—Green Technology, vol. 5, No. 1, Jan. 2018, pp. 5562.

Gu et al., Influences of Energy Density on Porosity and Microstructure of Selective Laser Melted 17-4PH Stainless Steel. 24th Inter-

(56) References Cited

OTHER PUBLICATIONS national SFF Symposium—An Additive Manufacturing Conference, Aug. 16, 2013, pp. 474-489.

Liu et al., Effects of melt-pool geometry on crystal growth and microstructure development in laser surface-melted superalloy single crystals, Mathematical modeling of single-crystal growth in a melt pool (Part 1), Science Direct, Acta Materialia, vol. 52, 2004, pp. 4833-4847.

European Search Report Corresponding to Application No. 20151670 dated Jun. 8, 2020.

European Search Report Corresponding to Application No. 20151734 dated Apr. 2, 2020.

Praniewicz et al, "Adaptive geometry transformation and repair for hybrid manufacturing", Procedia Manufacturing 26, 2018, pp. 228-236.

Praniewicz et al, "An Adaptive Geometry Transformation and Repair Method for Manufacturing", Journal of Manufacturing Science and Engineering, vol. 141, Sep. 2018, pp. 2-8.

Wilson et al, "Remanufacturing of turbine blades by laser direct deposition with its energy and environmental impact analysis", Journal of Cleaner Production 80, 2014, pp. 170-178.

European Search Report Corresponding to Application No. 20151679 dated Apr. 2, 2020.

European Search Report Corresponding to Application No. 20151688 dated Mar. 30, 2020.

European Search Report Corresponding to Application No. 20151717 dated Jun. 11, 2020.

European Search Report Corresponding to Application No. 20151810 dated May 15, 2020.

European Search Report Corresponding to Application No. 20178188 dated Nov. 3, 2020.

International Search Report Corresponding to Application No. PCT/SG2019/050049 dated Mar. 27, 2019.

Machine Translated Japanese Office Action Corresponding to Application No. 2020010732 dated Jan. 19, 2021.

Machine Translated Japanese Search Report Corresponding to Application No. 2020010713 dated Nov. 18, 2020.

USAF C-5 Galaxy, as shown in ETSY desk model set (Galaxy). (Year: 2021).

* cited by examiner

TOOLING ASSEMBLY FOR MAGNETICALLY ALIGNING COMPONENTS IN AN ADDITIVE MANUFACTURING MACHINE

FIELD

The present subject matter relates generally to additive manufacturing machines, and more particularly to tooling assemblies for aligning a plurality of components in a desired orientation for a powder bed additive manufacturing process.

BACKGROUND

Machine or device components frequently experience damage, wear, and/or degradation throughout their service life. For example, serviced compressor blades of a gas turbine engine show erosion, defects, and/or cracks after long term use. Specifically, for example, such blades are subject to significant stresses which inevitably cause blades to wear over time, particularly near the tip of the blade. For example, blade tips are susceptible to wear or damage from friction or rubbing between the blade tips and shrouds, from chemical degradation or oxidation from hot gasses, from fatigue caused by cyclic loading and unloading, from diffusion creep of crystalline lattices, etc.

Notably, worn or damaged blades may result in machine failure or performance degradation if not corrected. Specifically, such blades may cause a turbomachine to exhibit reduced operating efficiency as gaps between blade tips and turbine shrouds may allow gasses to leak through the turbine stages without being converted to mechanical energy. When efficiency drops below specified levels, the turbomachine is typically removed from service for overhaul and refurbishment. Moreover, weakened blades may result in complete fractures and catastrophic failure of the engine.

As a result, compressor blades for a gas turbine engine are typically the target of frequent inspections, repairs, or replacements. It is frequently very expensive to replace such blades altogether, however, some can be repaired for extended lifetime at relatively low cost (as compared to replacement with entirely new blades). Nevertheless, existing repair processes tend to be labor intensive and time consuming.

For example, a traditional compressor blade tip repair process uses a welding/cladding technique where repair materials are supplied, in either powder or wire form, to the blade tips. The repair materials are melted by focused power source (e.g., laser, e-beam, plasma arc, etc.) and bonded to blade tips. However, blades repaired with such welding/cladding technique need tedious post-processing to achieve the target geometry and surface finish. Specifically, due to the bulky feature size of the welding/cladding repair joint, the repaired blades require heavy machining to remove the extra materials on the tip, and further require a secondary polishing process to achieve a target surface finish. Notably, such a process is performed on a single blade at a time, is very labor intensive and tedious, and results in very large overall labor costs for a single repair.

Alternatively, other direct-energy-deposition (DED) methods may be used for blade repair, e.g., such as cold spray, which directs high-speed metal powders to bombard the target or base component such that the powders deform and deposit on the base component. However, none of these DED methods are suitable for batch processing or for repairing a large number of components in a time efficient manner, thus providing little or no business value.

Accordingly, novel systems and methods have been developed and are presented herein for repairing or rebuilding worn compressor blades (or any other components) using a powder bed additive manufacturing process. Specifically, such a repair process generally includes removing the worn portion of each of a plurality of compressor blades, positioning the plurality of compressor blades on a build platform of an additive manufacturing machine, determining the precise location of each blade tip, and printing repair segments directly onto the blade tips, layer by layer, until the compressor blades reach their original dimensions or another suitable target size and shape.

Notably, it may be desirable that each of the plurality of components is mounted on the build platform at a known and fixed spacing and orientation. In this regard, a vision system which is used to determine the precise coordinates of each blade tip may more accurately find such tips if all blades are equally spaced and oriented in the same direction. For example, to facilitate the vision system imaging process, the parts are preferably secured at same locations with high repeatability. Similarly, the recoating and print process may be improved if the blades are uniformly spaced and the recoater passes over each blade tip along the same direction.

Accordingly, a system and method for precisely and repeatedly mounting serviced components in an additive manufacturing machine would be useful. More particularly, an additive manufacturing machine including a tooling assembly for quickly and effectively mounting a plurality of compressor blades with equal spacing and uniform orientation would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, a tooling assembly for mounting a component in a powder bed additive manufacturing machine is provided. The tooling assembly comprising includes a component fixture configured for receiving the component, a mounting plate configured for receiving the component fixture, and a magnet assembly operably coupling the mounting plate to the component fixture for securing the component fixture to the mounting plate in a desired orientation.

In another exemplary aspect of the present disclosure, a method of mounting a component in a powder bed additive manufacturing machine is provided. The method includes mounting the component in a component fixture, positioning the component fixture on a mounting plate, and securing the component in the desired orientation on the mounting plate using a magnet assembly.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
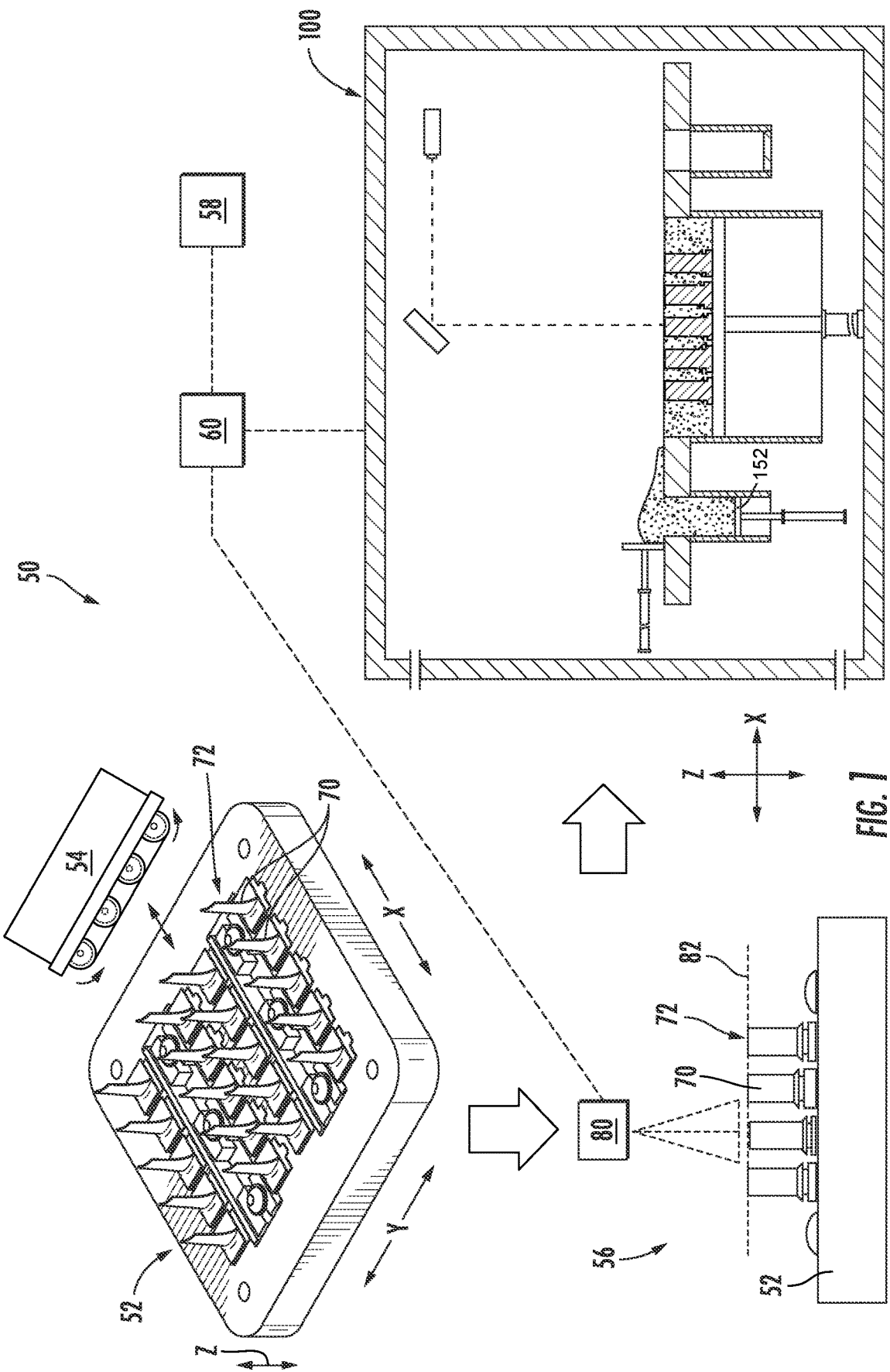
FIG. 1 shows a schematic representation of an additive repair system that may be used for repairing or rebuilding components according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the accompanying drawings. Each example is provided by way of explanation of the invention, not limitation of the invention. In fact, it will be apparent to those skilled in the art that various configurations, modifications, and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. In addition, the terms "upstream" and "downstream" refer to the relative direction with respect to the motion of an object or a flow of fluid. For example, "upstream" refers to the direction from which the object has moved or fluid has flowed, and "downstream" refers to the direction to which the object is moving or the fluid is flowing. Furthermore, as used herein, terms of approximation, such as "approximately," "substantially," or "about," refer to being within a ten percent margin of error.

Aspects of the present subject matter are directed to a system and method for repairing one or more components using an additive manufacturing process. The method includes securing the components in a tooling assembly such that a repair surface of each component is positioned within a single build plane, determining a repair toolpath corresponding to the repair surface of each component using a vision system, depositing a layer of additive powder over the repair surface of each component using a powder dispensing assembly, and selectively irradiating the layer of additive powder along the repair toolpath to fuse the layer of additive powder onto the repair surface of each component.

Specifically, aspects of the present subject matter provide a tooling assembly for mounting a plurality of components, such as compressor blades, in a powder bed additive manufacturing machine to facilitate such a repair process. The tooling assembly includes component fixtures configured for receiving each of the compressor blades, a mounting plate for receiving the component fixtures, and a magnet assembly operably coupling the component fixtures to the mounting plate in a desired position and orientation to facilitate an improved printing process.

As described in detail below, exemplary embodiments of the present subject matter involve the use of additive manufacturing machines or methods. As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 µm and 200 µm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 µm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

After fabrication of the component is complete, various post-processing procedures may be applied to the component. For example, post processing procedures may include removal of excess powder by, for example, blowing or vacuuming. Other post processing procedures may include a stress relief process. Additionally, thermal, mechanical, and/or chemical post processing procedures can be used to finish the part to achieve a desired strength, surface finish, and other component properties or features.

Notably, in exemplary embodiments, several aspects and features of the present subject matter were previously not possible due to manufacturing restraints. However, the present inventors have advantageously utilized current advances in additive manufacturing techniques to improve various components and the method of additively manufacturing such components. While the present disclosure is not limited to the use of additive manufacturing to form these components generally, additive manufacturing does provide a variety of manufacturing advantages, including ease of manufacturing, reduced cost, greater accuracy, etc.

Also, the additive manufacturing methods described above enable much more complex and intricate shapes and contours of the components described herein to be formed with a very high level of precision. For example, such components may include thin additively manufactured layers, cross sectional features, and component contours. In addition, the additive manufacturing process enables the manufacture of a single component having different materials such that different portions of the component may exhibit different performance characteristics. The successive, additive nature of the manufacturing process enables the construction of these novel features. As a result, components formed using the methods described herein may exhibit improved performance and reliability.

Referring now to FIG. 1, an exemplary additive repair system 50 will be described according to an exemplary embodiment of the present subject matter. As illustrated, additive repair system 50 generally includes a tooling fixture or assembly 52, a material removal assembly 54, a vision system 56, a user interface panel 58, and an additive manufacturing machine or system 100. Furthermore, a system controller 60 may be operably coupled with some or all parts of additive repair system 50 for facilitating system operation. For example, system controller 60 may be operably coupled to user interface panel 58 to permit operator communication with additive repair system 50, e.g., to input commands, upload printing toolpaths or CAD models, initiating operating cycles, etc. Controller 60 may further be in communication with vision system 56 for receiving imaging data and with AM machine 100 for performing a printing process.

According to exemplary embodiments, tooling assembly 52 is generally configured for supporting a plurality of components in a desired position and orientation. According to exemplary embodiments, tooling assembly 52 supports 20 high pressure compressor blades 70 during an additive manufacturing repair process. Specifically, the additive manufacturing process may be a powder bed fusion process (e.g., a DMLM or DMLS process as described above). Although the repaired components are illustrated herein as compressor blades 70 of a gas turbine engine, it should be appreciated that any other suitable component may be repaired, such as turbine blades, other airfoils, or components from other machines. In order to achieve proper recoating and to facilitate the printing process, it may be desirable to position all blades 70 in the same orientation and at the same height such that a repair surface 72 of each blade is in a single build plane. Tooling assembly 52 is a fixture intended to secure blades 70 in such desired position and orientation.

Material removal assembly 54 may include a machine or device configured for grinding, machining, brushing, etching, polishing, wire electrical discharge machining (EDM), cutting, or otherwise substantively modifying a component, e.g., by subtractive modification or material removal. For example, material removal assembly 54 may include a belt grinder, a disc grinder, or any other grinding or abrasive mechanism. According to an exemplary embodiment, material removal assembly 54 may be configured for removing material from a tip of each blade 70 to obtain a desirable repair surface 72. For example, as explained briefly above, material removal assembly 54 may remove at least a portion of blades 70 that have been worn or damaged, e.g., which may include microcracks, pits, abrasions, defects, foreign material, depositions, imperfections, and the like. According to an exemplary embodiment, each blade 70 is prepared using material removal assembly 54 to achieve the desired repair surface 72, after which the blades 70 are all mounted in tooling assembly 52 and leveled appropriately. However, according to alternative embodiments, material removal assembly 54 may grind each blade 70 as it is fixed in position in tooling assembly 52.

After the blades are prepared, vision system 56 may be used to obtain an image or digital representation of the precise position and coordinates of each blade 70 positioned in tooling assembly 52. In this regard, according to exemplary embodiments, vision system 56 may include any suitable camera or cameras 80, scanners, imaging devices, or other machine vision device that may be operably configured to obtain image data that includes a digital representation of one or more fields of view. Such a digital representation may sometimes be referred to as a digital image or an image; however, it will be appreciated that the present disclosure may be practiced without rendering such a digital representation in human-visible form. Nevertheless, in some embodiments, a human-visible image corresponding to a field of view may be displayed on the user interface 58 based at least in part on such a digital representation of one or more fields of view.

Figure 4:
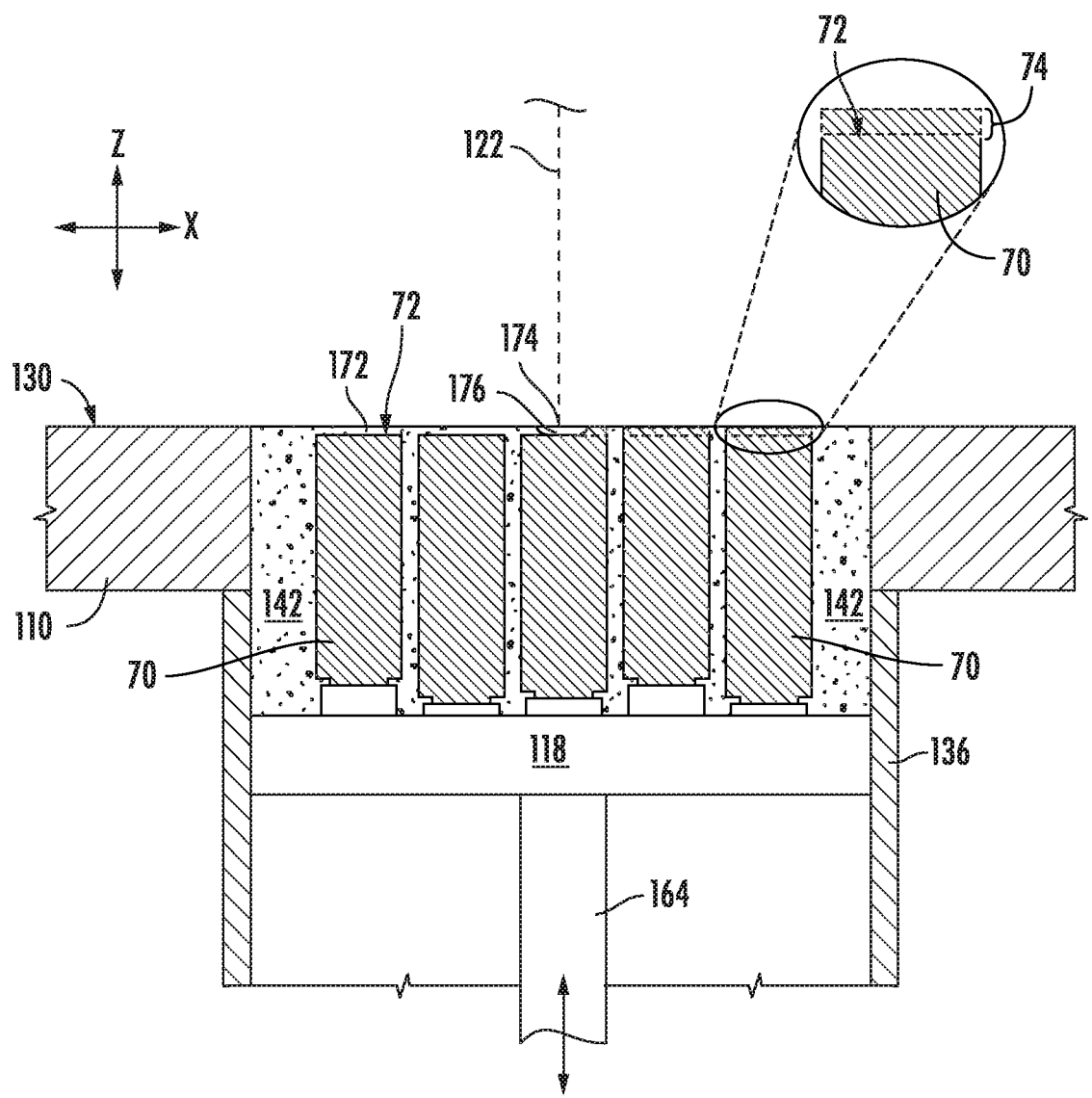
FIG. 4 shows a close-up schematic view of a build platform of the exemplary additive manufacturing machine of FIG. 3 according to an exemplary embodiment of the present subject matter.

Vision system 56 allows the additive repair system 50 to obtain information pertaining to one or more blades 70 onto which one or more repair segments 74 (see FIG. 4) may be respectively additively printed. In particular, the vision system 56 allows the one or more blades 70 to be located and defined so that the additive manufacturing machine 100 may be instructed to print one or more repair segments 74 on a corresponding one or more blades 70 with suitably high accuracy and precision. According to an exemplary embodiment, the one or more blades 70 may be secured to tooling assembly 52, a mounting plate, a build platform, or any other fixture with repair surface 72 of the respective blades 70 aligned to a single build plane 82.

The one or more cameras 80 of the vision system 56 may be configured to obtain two-dimensional or three-dimensional image data, including a two-dimensional digital representation of a field of view and/or a three-dimensional digital representation of a field of view. Alignment of the repair surface 72 of the blades 70 with the build plane 82 allows the one or more cameras 80 to obtain higher quality images. For example, the one or more cameras 80 may have a focal length adjusted or adjustable to the build plane 82. With the repair surface 72 of one or more blades 70 aligned to the build plane 82, the one or more cameras may readily obtain digital images of the repair surface 72. The one or more cameras 80 may include a field of view that encompasses all or a portion of the one or more blades 70 secured to the tooling assembly 52. For example, a single field of view may be wide enough to encompass a plurality of blades 70, such as each of a plurality of workpieces secured to tooling assembly 52. Alternatively, a field of view may more narrowly focus on an individual blade 70 such that digital representations of respective blades 70 are obtained separately. It will be appreciated that separately obtained digital images may be stitched together to obtain a digital representation of a plurality of components or blades 70. In some embodiments, the camera 80 may include a collimated lens configured to provide a flat focal plane, such that blades 70 or portions thereof located towards the periphery of the field of view are not distorted. Additionally, or in the alternative, the vision system 56 may utilize a distortion correction algorithm to address any such distortion.

Image data obtained by the vision system 56, including a digital representation of one or more blades 70 may be transmitted to a control system, such as controller 60. Controller 60 may be configured to determine a repair surface 72 of each of a plurality of blades 70 from one or more digital representations of one or more fields of view having been captured by the vision system 56, and then determine one or more coordinates of the repair surface 72 of respective ones of the plurality of blades 70. Based on the one or more digital representations, controller 60 may generate one or more print commands (e.g., corresponding to one or more repair toolpaths, e.g., the path of a laser focal point), which may be transmitted to an additive manufacturing machine 100 such that the additive manufacturing machine 100 may additively print a plurality of repair segments 74 on respective ones of the plurality of blades 70. The one or more print commands may be configured to additively print a plurality of repair segments 74 with each respective one of the plurality of repair segments 74 being located on the repair surface 72 of a corresponding blade 70.

Each of the components and subsystems of additive repair system 50 are described herein in the context of an additive blade repair process. However, it should be appreciated that aspects of the present subject matter may be used to repair or rebuild any suitable components. The present subject matter is not intended to be limited to the specific repair process described. In addition, FIG. 1 illustrates each of the systems as being distinct or separate from each other and implies the process steps should be performed in a particular order, however, it should be appreciated that these subsystems may be integrated into a single machine, process steps may be swapped, and other changes to the build process may be implemented while remaining within the scope of the present subject matter.

For example, vision system 56 and additive manufacturing machine 100 may be provided as a single, integrated unit or as separate stand-alone units. In addition, controller 60 may include one or more control systems. For example, a single controller 60 may be operably configured to control operations of the vision system 56 and the additive manufacturing machine 100, or separate controllers 60 may be operably configured to respectively control the vision system 56 and the additive manufacturing machine 100.

Figure 2:
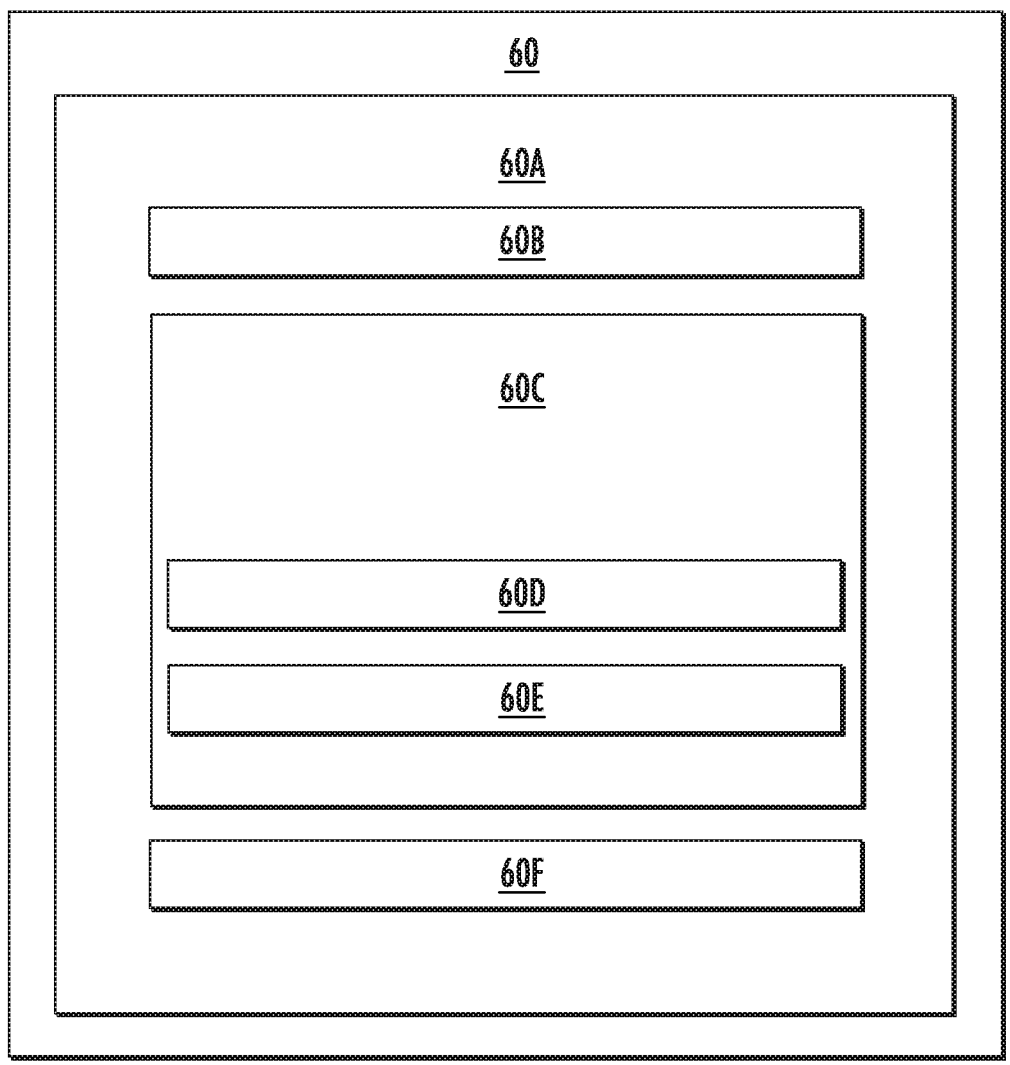
FIG. 2 depicts certain components of a controller according to example embodiments of the present subject matter.

Operation of additive repair system 50, vision system 56, and AM machine 100 may be controlled by electromechanical switches or by a processing device or controller 60 (see, e.g., FIGS. 1 through 2). According to exemplary embodiments, controller 60 may be operatively coupled to user interface panel 58 for user manipulation, e.g., to control the operation of various components of AM machine 100 or system 50. In this regard, controller 60 may operably couple all systems and subsystems within additive repair system 50 to permit communication and data transfer therebetween. In this manner, controller 60 may be generally configured for operating additive repair system 50 or performing one or more of the methods described herein.

FIG. 2 depicts certain components of controller 60 according to example embodiments of the present disclosure. Controller 60 can include one or more computing device(s) 60A which may be used to implement methods as described herein. Computing device(s) 60A can include one or more processor(s) 60B and one or more memory device(s) 60C. The one or more processor(s) 60B can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 60C can include one or more non-transitory computer-readable storage medium(s), such as RAM, ROM, EEPROM, EPROM, flash memory devices, magnetic disks, etc., and/or combinations thereof.

The memory device(s) 60C can include one or more computer-readable media and can store information accessible by the one or more processor(s) 60B, including instructions 60D that can be executed by the one or more processor(s) 60B. For instance, the memory device(s) 60C can store instructions 60D for running one or more software applications, displaying a user interface, receiving user input, processing user input, etc. In some implementations, the instructions 60D can be executed by the one or more processor(s) 60B to cause the one or more processor(s) 60B to perform operations, e.g., such as one or more portions of methods described herein. The instructions 60D can be software written in any suitable programming language or can be implemented in hardware. Additionally, and/or alternatively, the instructions 60D can be executed in logically and/or virtually separate threads on processor(s) 60B.

The one or more memory device(s) 60C can also store data 60E that can be retrieved, manipulated, created, or stored by the one or more processor(s) 60B. The data 60E can include, for instance, data to facilitate performance of methods described herein. The data 60E can be stored in one or more database(s). The one or more database(s) can be connected to controller 60 by a high bandwidth LAN or WAN, or can also be connected to controller through one or more network(s) (not shown). The one or more database(s) can be split up so that they are located in multiple locales. In some implementations, the data 60E can be received from another device.

The computing device(s) 60A can also include a communication module or interface 60F used to communicate with one or more other component(s) of controller 60 or additive manufacturing machine 100 over the network(s). The communication interface 60F can include any suitable components for interfacing with one or more network(s), including for example, transmitters, receivers, ports, controllers, antennas, or other suitable components.

Figure 3:
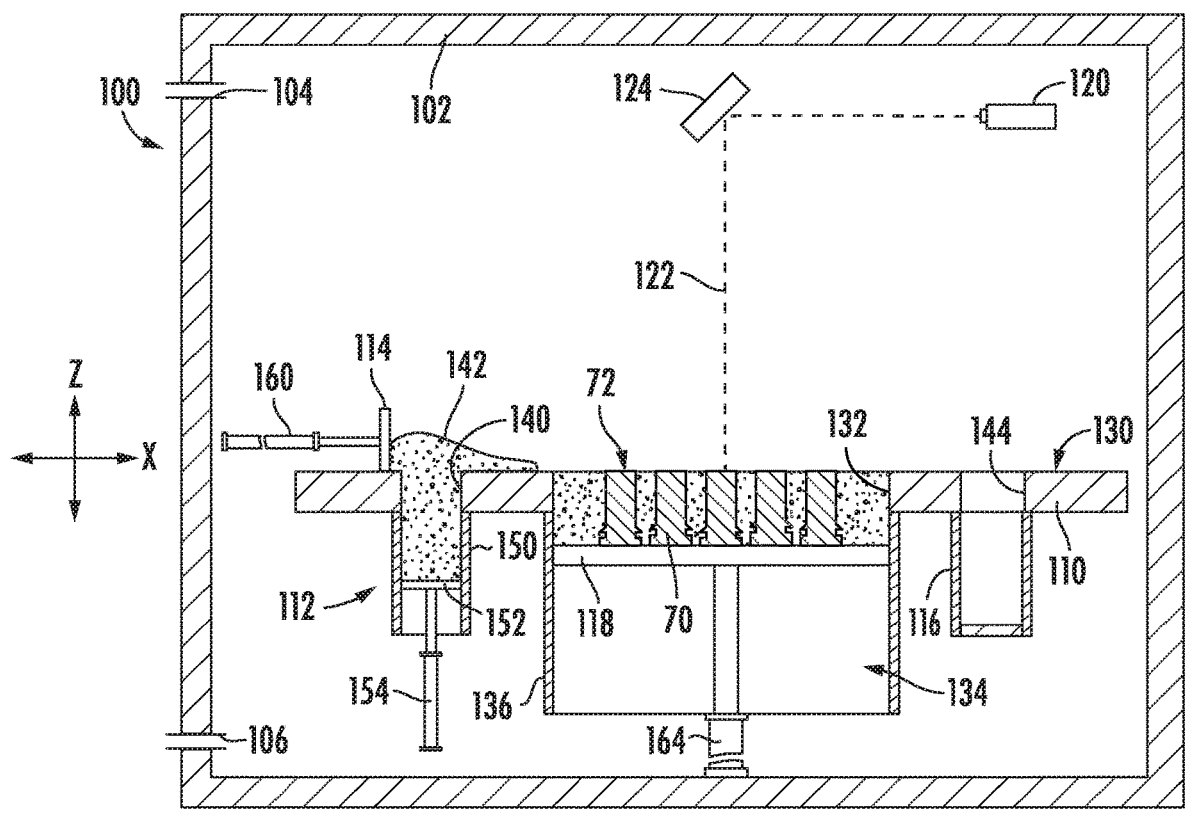
FIG. 3 shows a schematic view of an additive manufacturing machine that may be used as part of the exemplary additive manufacturing system of FIG. 1 according to an exemplary embodiment of the present subject matter.

Referring now to FIG. 3, an exemplary laser powder bed fusion system, such as a DMLS or DMLM system 100, will be described according to an exemplary embodiment. Specifically, AM system 100 is described herein as being used to build or repair blades 70. It should be appreciated that blades 70 are only an exemplary component to be built or repaired and are used primarily to facilitate description of the operation of AM machine 100. The present subject matter is not intended to be limited in this regard, but instead AM machine 100 may be used for printing repair segments on any suitable plurality of components.

As illustrated, AM system 100 generally defines a vertical direction V or Z-direction, a lateral direction L or X-direction, and a transverse direction T or Y-direction (see FIG. 1), each of which is mutually perpendicular, such that an orthogonal coordinate system is generally defined. As illustrated, system 100 includes a fixed enclosure or build area 102 which provides a contaminant-free and controlled environment for performing an additive manufacturing process. In this regard, for example, enclosure 102 serves to isolate and protect the other components of the system 100. In addition, enclosure 102 may be provided with a flow of an appropriate shielding gas, such as nitrogen, argon, or another suitable gas or gas mixture. In this regard, enclosure 102 may define a gas inlet port 104 and a gas outlet port 106 for receiving a flow of gas to create a static pressurized volume or a dynamic flow of gas.

Enclosure 102 may generally contain some or all components of AM system 100. According to an exemplary embodiment, AM system 100 generally includes a table 110, a powder supply 112, a scraper or recoater mechanism 114, an overflow container or reservoir 116, and a build platform 118 positioned within enclosure 102. In addition, an energy source 120 generates an energy beam 122 and a beam steering apparatus 124 directs energy beam 122 to facilitate the AM process as described in more detail below. Each of these components will be described in more detail below.

According to the illustrated embodiment, table 110 is a rigid structure defining a planar build surface 130. In addition, planar build surface 130 defines a build opening 132 through which build chamber 134 may be accessed. More specifically, according to the illustrated embodiment, build chamber 134 is defined at least in part by vertical walls 136 and build platform 118. In addition, build surface 130 defines a supply opening 140 through which additive powder 142 may be supplied from powder supply 112 and a reservoir opening 144 through which excess additive powder 142 may pass into overflow reservoir 116. Collected additive powders may optionally be treated to sieve out loose, agglomerated particles before re-use.

Powder supply 112 generally includes an additive powder supply container 150 which generally contains a volume of additive powder 142 sufficient for some or all of the additive manufacturing process for a specific part or parts. In addition, powder supply 112 includes a supply platform 152, which is a plate-like structure that is movable along the vertical direction within powder supply container 150. More specifically, a supply actuator 154 vertically supports supply platform 152 and selectively moves it up and down during the additive manufacturing process.

AM system 100 further includes recoater mechanism 114, which is a rigid, laterally-elongated structure that lies proximate build surface 130. For example, recoater mechanism 114 may be a hard scraper, a soft squeegee, or a roller. Recoater mechanism 114 is operably coupled to a recoater actuator 160 which is operable to selectively move recoater mechanism 114 along build surface 130. In addition, a platform actuator 164 is operably coupled to build platform 118 and is generally operable for moving build platform 118 along the vertical direction during the build process. Although actuators 154, 160, and 164 are illustrated as being hydraulic actuators, it should be appreciated that any other type and configuration of actuators may be used according to alternative embodiments, such as pneumatic actuators, hydraulic actuators, ball screw linear electric actuators, or any other suitable vertical support means. Other configurations are possible and within the scope of the present subject matter.

As used herein, "energy source" may be used to refer to any device or system of devices configured for directing an energy beam of suitable power and other operating characteristics towards a layer of additive powder to sinter, melt, or otherwise fuse a portion of that layer of additive powder during the build process. For example, energy source 120 may be a laser or any other suitable irradiation emission directing device or irradiation device. In this regard, an irradiation or laser source may originate photons or laser beam irradiation which is directed by the irradiation emission directing device or beam steering apparatus.

According to an exemplary embodiment, beam steering apparatus 124 includes one or more mirrors, prisms, lenses, and/or electromagnets operably coupled with suitable actuators and arranged to direct and focus energy beam 122. In this regard, for example, beam steering apparatus 124 may be a galvanometer scanner that moves or scans the focal point of the laser beam 122 emitted by energy source 120 across the build surface 130 during the laser melting and sintering processes. In this regard, energy beam 122 can be focused to a desired spot size and steered to a desired position in plane coincident with build surface 130. The galvanometer scanner in powder bed fusion technologies is typically of a fixed position but the movable mirrors/lenses contained therein allow various properties of the laser beam to be controlled and adjusted. According to exemplary embodiments, beam steering apparatus may further include one or more of the following: optical lenses, deflectors, mirrors, beam splitters, telecentric lenses, etc.

It should be appreciated that other types of energy sources 120 may be used which may use an alternative beam steering apparatus 124. For example, an electron beam gun or other electron source may be used to originate a beam of electrons (e.g., an "e-beam"). The e-beam may be directed by any suitable irradiation emission directing device preferably in a vacuum. When the irradiation source is an electron source, the irradiation emission directing device may be, for example, an electronic control unit which may include, for example, deflector coils, focusing coils, or similar elements. According to still other embodiments, energy source 120 may include one or more of a laser, an electron beam, a plasma arc, an electric arc, etc.

Prior to an additive manufacturing process, recoater actuator 160 may be lowered to provide a supply of powder 142 of a desired composition (for example, metallic, ceramic, and/or organic powder) into supply container 150. In addition, platform actuator 164 may move build platform 118 to an initial high position, e.g., such that it substantially flush or coplanar with build surface 130. Build platform 118 is then lowered below build surface 130 by a selected layer increment. The layer increment affects the speed of the additive manufacturing process and the resolution of a components or parts (e.g., blades 70) being manufactured. As an example, the layer increment may be about 10 to 100 micrometers (0.0004 to 0.004 in.).

Additive powder is then deposited over the build platform 118 before being fused by energy source 120. Specifically, supply actuator 154 may raise supply platform 152 to push powder through supply opening 140, exposing it above build surface 130. Recoater mechanism 114 may then be moved across build surface 130 by recoater actuator 160 to spread the raised additive powder 142 horizontally over build platform 118 (e.g., at the selected layer increment or thickness). Any excess additive powder 142 drops through the reservoir opening 144 into the overflow reservoir 116 as recoater mechanism 114 passes from left to right (as shown in FIG. 3). Subsequently, recoater mechanism 114 may be moved back to a starting position.

Therefore, as explained herein and illustrated in FIG. 3, recoater mechanism 114, recoater actuator 160, supply platform 152, and supply actuator 154 may generally operate to successively deposit layers of additive powder 142 or other additive material to facilitate the print process. As such, these components may collectively be referred to herein as powder dispensing apparatus, system, or assembly. The leveled additive powder 142 may be referred to as a "build layer" 172 (see FIG. 4) and the exposed upper surface thereof may be referred to as build surface 130. When build platform 118 is lowered into build chamber 134 during a build process, build chamber 134 and build platform 118 collectively surround and support a mass of additive powder 142 along with any components (e.g., blades 70) being built. This mass of powder is generally referred to as a "powder bed," and this specific category of additive manufacturing process may be referred to as a "powder bed process."

During the additive manufacturing process, the directed energy source 120 is used to melt a two-dimensional cross-section or layer of the component (e.g., blades 70) being built. More specifically, energy beam 122 is emitted from energy source 120 and beam steering apparatus 124 is used to steer the focal point 174 of energy beam 122 over the exposed powder surface in an appropriate pattern (referred to herein as a "toolpath"). A small portion of exposed layer of the additive powder 142 surrounding focal point 174, referred to herein as a "weld pool" or "melt pool" or "heat effected zone" 176 (best seen in FIG. 4) is heated by energy beam 122 to a temperature allowing it to sinter or melt, flow, and consolidate. As an example, melt pool 176 may be on the order of 100 micrometers (0.004 in.) wide. This step may be referred to as fusing additive powder 142.

Build platform 118 is moved vertically downward by the layer increment, and another layer of additive powder 142 is applied in a similar thickness. The directed energy source 120 again emits energy beam 122 and beam steering apparatus 124 is used to steer the focal point 174 of energy beam 122 over the exposed powder surface in an appropriate pattern. The exposed layer of additive powder 142 is heated by energy beam 122 to a temperature allowing it to sinter or melt, flow, and consolidate both within the top layer and with the lower, previously-solidified layer. This cycle of moving build platform 118, applying additive powder 142, and then directed energy beam 122 to melt additive powder 142 is repeated until the entire component (e.g., blades 70) is complete.

Referring now generally to FIGS. 5 through 10, a tooling assembly 200 that may be used with AM system 100 will be described according to an exemplary embodiment of the present subject matter. For example, tooling assembly 200 may replace tooling assembly 52 as described in relation to FIG. 1. Due to the similarity between tooling assembly 200, tooling assembly 52, and the AM system 100 in which they are configured for operating, like reference numerals will be used in FIGS. 5 through 10 to refer to like features described with respect to FIG. 1.

Figure 5:
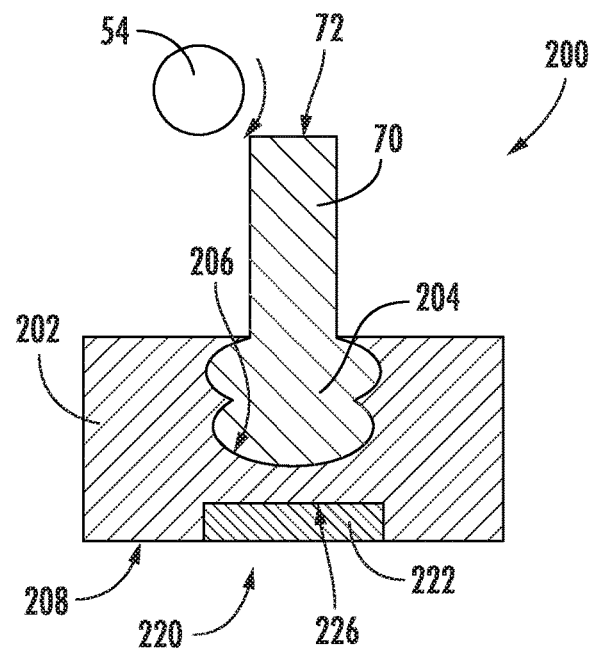
FIG. 5 is a schematic cross sectional view of part of a magnet assembly mounted within a component fixture according to an exemplary embodiment of the present subject matter.
Figure 6:
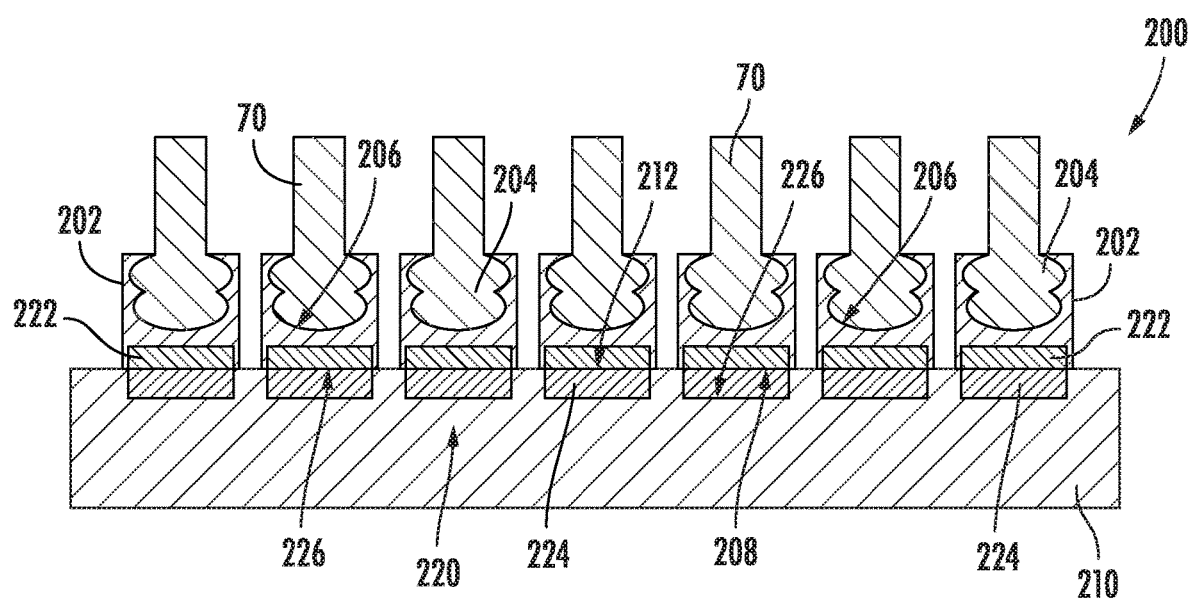
FIG. 6 is a schematic cross sectional view of a plurality of component fixtures mounted to a mounting plate using magnet assemblies in accordance with an exemplary embodiment of the present subject matter.

Referring now specifically to FIGS. 5 and 6, tooling assembly 200 will be described according to an exemplary embodiment of the present subject matter. As explained above, tooling assembly 200 is generally configured for receiving one or more components, e.g., shown here as blades 70, and securely mounting such components for a subsequent additive manufacturing process. Specifically, tooling assembly 200 may secure each of the plurality of blades 70 in a desired position and orientation relative to AM machine 100.

Tooling assembly 200 generally includes a component fixture 202 configured for receiving one or more blades 70. According to the illustrated embodiment, each component fixture 202 is configured for receiving a single blade 70. In this regard, blade 70 may define a dovetail 204 which is configured for receipt in a complementary slot 206 defined in component fixture 202. In this regard, once blade 70 is installed into complementary slot 206 of component fixture 202, blades 70 may not move or rotate relative to component fixture 202. Component fixture 202 may generally be a rectangular block with a flat bottom surface 208 which may sit flush against another flat surface.

Tooling assembly 200 may further include a mounting plate 210 that is configured for receiving the plurality of component fixtures 202. In this regard, mounting plate 210 may be a rigid plate having a flat receiving surface 212 upon which component fixtures 202 may be seated. Notably, as described briefly above, it is desirable to fix the position and orientation of blades 70 prior to an additive manufacturing process. In this regard, as used herein, the "position" of a blade 70 may refer to the coordinates of a centroid of blade 70 in the X-Y plane. In addition, the "orientation" of a blade 70 may refer to an angular position of blade 70 about the Z-direction.

Figure 7:
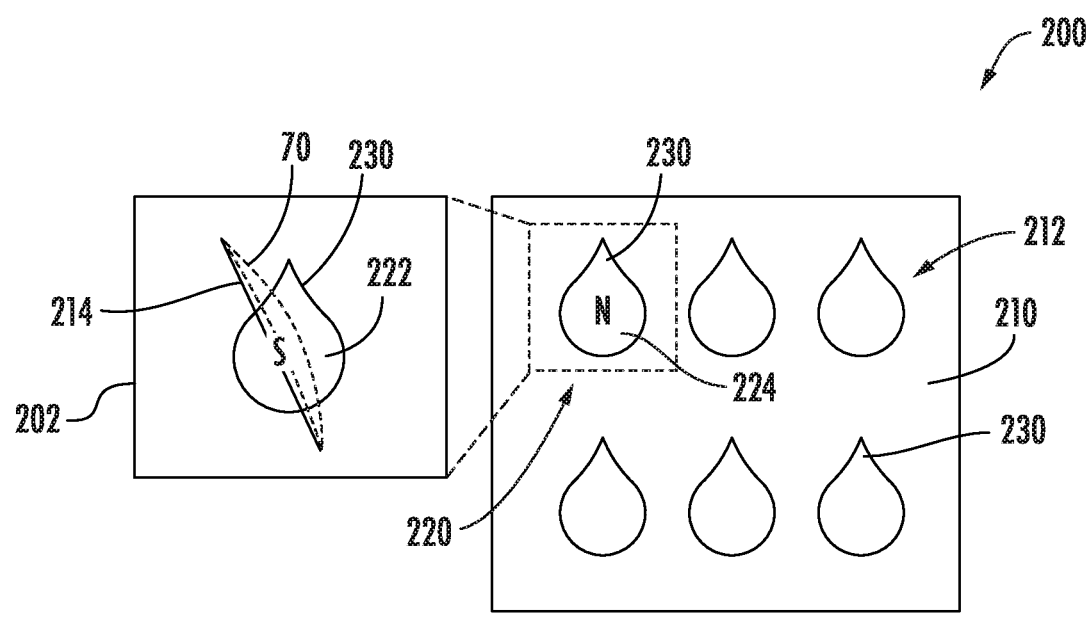
FIG. 7 provides a schematic view of another magnet assembly according to an exemplary embodiment of the present subject matter.

More specifically, according to an exemplary embodiment, each blade 70 may define a chord line 214 which is a straight line extending from a leading edge to a trailing edge of the airfoil (see FIG. 7). According to an exemplary embodiment, the orientation of each blade 70 may be defined according to the angular position of chord line 214. In this regard, for example, two blades 70 are said to have the same "orientation" when chord lines 214 of those blades 70 are parallel to each other. Although the exemplary repaired components described herein are blades 70, it should be appreciated that other components such as other airfoils or any other machine component may be repaired according to alternative embodiments, and the orientation of such components may be redefined accordingly.

According to the exemplary embodiment described herein, mounting plate 210 is configured for receiving a plurality of component fixtures 202 before being positioned at a known location on build platform 118. However, it should be appreciated that according to alternative embodiments build platform 118 may be used directly as a mounting plate 210. In this regard, for example, mounting plate 210 may be removed altogether and component fixtures 202 may be positioned, oriented, and secured where desired directly on build platform 118.

Component fixture 202 may generally be formed from any suitable material and may have any suitable shape. According to the illustrated embodiment component fixture 202 is formed from metal such that it may be reused for multiple repair and rebuild processes. Specifically, once blades 70 have been repaired using a powder bed additive manufacturing process as described below, each blade 70 may be removed from the corresponding component fixture 202 and component fixture 202 may be used to hold another blade 70 in a subsequent repair process.

Tooling assembly 200 may further include a magnet assembly 220 which is used to operably couple each component fixture 202 to mounting plate 210. More specifically, according to the illustrated embodiment, magnet assembly 220 both secures each component fixture 202 and positions each component fixture in the desired orientation for a specific print process. Generally speaking, magnet assembly 220 may include any suitable combination of permanent magnets, electromagnets, or other suitable magnetic materials or combinations thereof which are configured for operably coupling component fixtures 202 or blades 70 to mounting plate 210 as described herein. Several exemplary magnet assemblies 220 are described below to facilitate discussion of operating principles of the present disclosure, but are not intended to limit the scope of the present disclosure in any manner.

Referring now specifically to FIGS. 5 and 6, magnet assembly 220 includes a fixture magnet 222 that is mounted to each component fixture 202. Similarly, tooling assembly 200 may include a plurality of plate magnets 224 that are mounted to mounting plate 210 at the desired positions where blades 70 should be secured. Fixture magnet 222 and plate magnet 224 may be mounted or secured to component fixture 202 and mounting plate 210, respectively, in any suitable manner. For example, component fixture 202 and mounting plate 210 may each define one or more magnet recesses 226 which are configured to receive respective magnets 222, 224. In this regard, for example, fixture magnet 222 may be positioned within magnet recess 226 defined in flat bottom surface 208 of component fixture 202. Magnets 222, 224 may be secured within magnet recesses 226 using an adhesive, a mechanical fastener, a press fit interface, or in any other suitable manner. According to alternative embodiments, fixture magnet 222 may be embedded within component fixture 202 and plate magnets 224 may be embedded within mounting plate 210.

In order to secure component fixtures 202 to mounting plate 210, fixture magnet 222 and plate magnet 224 may have opposing magnetic poles such that component fixtures 202 are urged toward mounting plate 210. In this regard, for example, each fixture magnet 222 may be a south pole of a permanent magnet. By contrast, each plate magnet 224 may be a north pole of a permanent magnet. As a result, fixture magnet 222 and plate magnet 224 each generate magnetic fields which result in a magnetic attraction that urges component fixture 202 toward mounting plate 210. Although north and south are used generally herein to characterize the magnetic field generated by a particular magnet, it should be appreciated that fixture magnet 222 and plate magnet 224 may swap positions, may generate magnetic fields having any other suitable direction and magnitude, and may be any other suitable type of device for generating a magnetic field.

As best shown in FIG. 6, a plurality of blades 70 may be mounted at a fixed position on mounting plate 210 by positioning the corresponding component fixture 202 near mounting plate 210 such that plate magnet 224 attracts fixture magnet 222 to position and secure component fixture 202. After all blades 70 have been mounted to mounting plate 210, the material removal process may be performed to remove material above repair surface 72 of each blade 70. By contrast, according to alternative embodiments, each blade 70 may be separately prepared by grinding or removing the tip of that blade 70 prior to mounting on mounting plate 210.

Notably, the use of a single fixture magnet 222 and plate magnet 224 for securing each blade 70 as shown in FIGS. 5 and 6 may effectively position blades 70 at the desired coordinates in the X-Y plane, but may not position blades 70 in the desired orientation. Referring now also to FIG. 7, fixture magnet 222 and plate magnet 224 may have a non-circular geometry such that the magnetic field generated by fixture magnet 222 and plate magnet 224 have a tendency to orient component fixture 202 and thus blades 70 along a certain direction. In this regard, the intensity of the magnetic field at a sharp corner or other protrusion 230 may be stronger than along the rounded surfaces of magnets 222, 224. As a result, magnets 222, 224 have a tendency to align such that sharp corners or protrusions 230 point towards the same direction and such that magnets 222, 224 have the same alignment within the X-Y plane. It should be appreciated that any suitable unbalanced geometry of magnets 222, 224 may be used to generate magnetic fields which have a tendency to align with each other. Although an exemplary geometry is described herein, the present subject matter is not intended to be limited to such a geometry.

Figure 8:
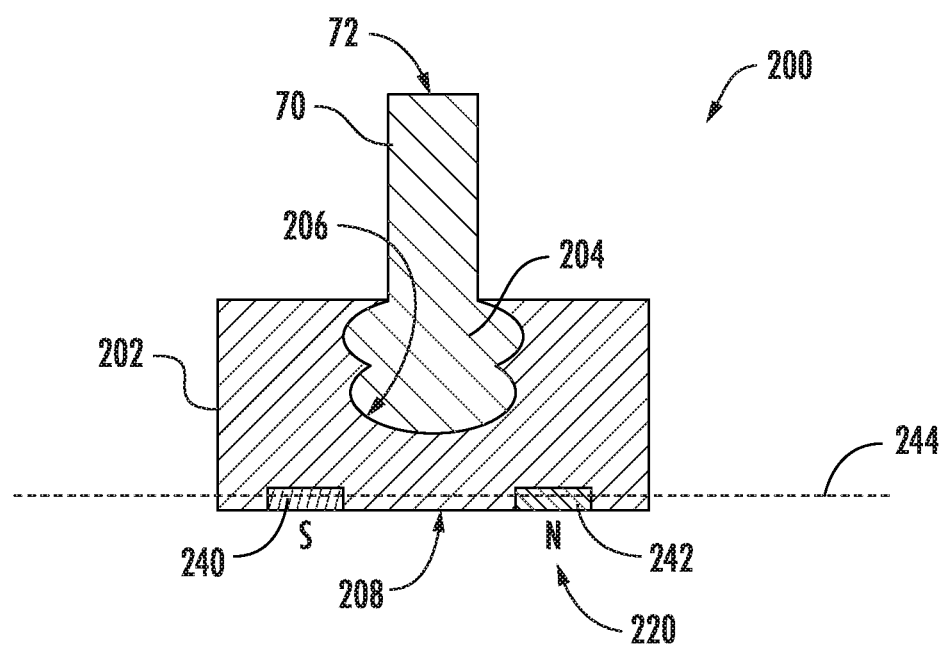
FIG. 8 is a schematic cross sectional view of part of a magnet assembly mounted within a component fixture according to an exemplary embodiment of the present subject matter.
Figure 9:
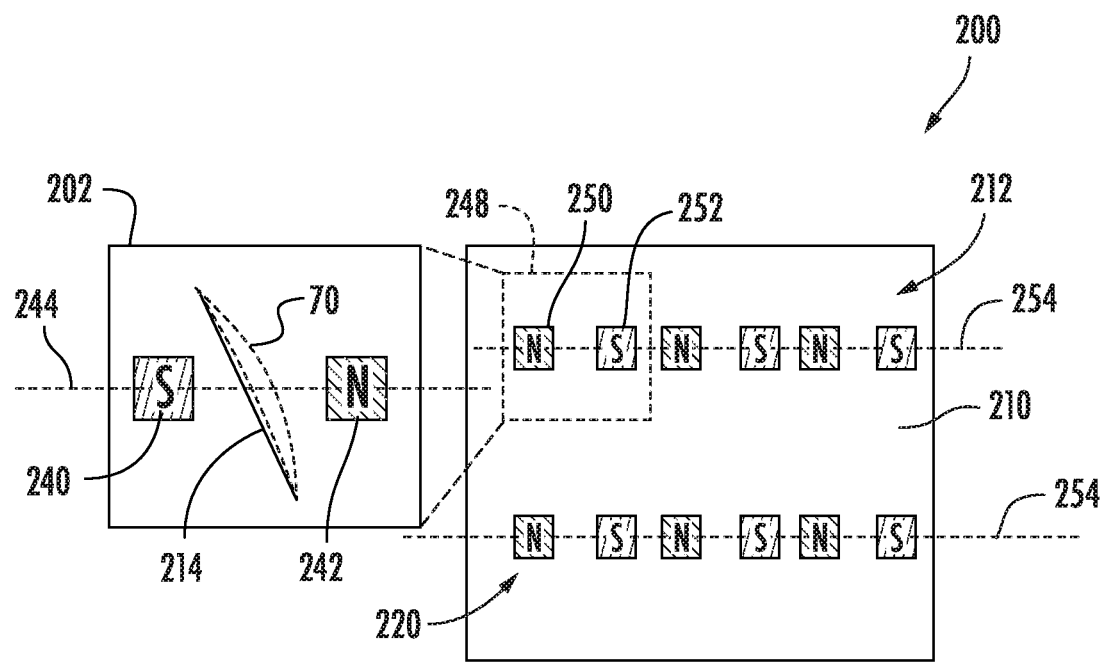
FIG. 9 is a schematic view of the exemplary component fixture of FIG. 8 being mounted to a mounting plate using the exemplary magnet assembly of FIG. 8.

Referring now to FIGS. 8 and 9, magnet assembly 200 may include a plurality of magnets positioned in each of component fixtures 202 and mounting plate 210 in order to position component fixtures 202 at the desired positions and orient blades 70 along the desired direction. In this regard, for example, magnet assembly 220 may include a first fixture magnet 240 and a second fixture magnet 242 mounted to each component fixture 202. More specifically, first fixture magnet 240 and second fixture magnet 242 may be spaced apart along a fixture magnetic axis 244 and may have opposing magnetic poles (e.g., north and south poles). Similarly, each blade position 248 defined on mounting plate 210 may include a first plate magnet 250 and a second plate magnet 252 mounted to mounting plate 210. More specifically, first plate magnet 250 and second plate magnet 252 may be spaced apart along a plate magnetic axis 254 and may have opposing magnetic poles (e.g., north and south poles). Notably, positioning component fixture 202 close to blade position 248 on mounting plate 210 will urge component fixture 202 toward mounting plate 210 such that fixture magnetic axis 244 is substantially parallel to plate magnetic axis 254. In this manner, each component fixture 202 is secured to mounting plate 210 at the desired position and in the desired orientation. Although component fixture 202 and mounting plate 210 are illustrated herein as including separate magnets having opposite magnetic poles, it should be appreciated that a single bar magnet or any other magnetic coupling assembly may be used according to alternative embodiments.

Figure 10:
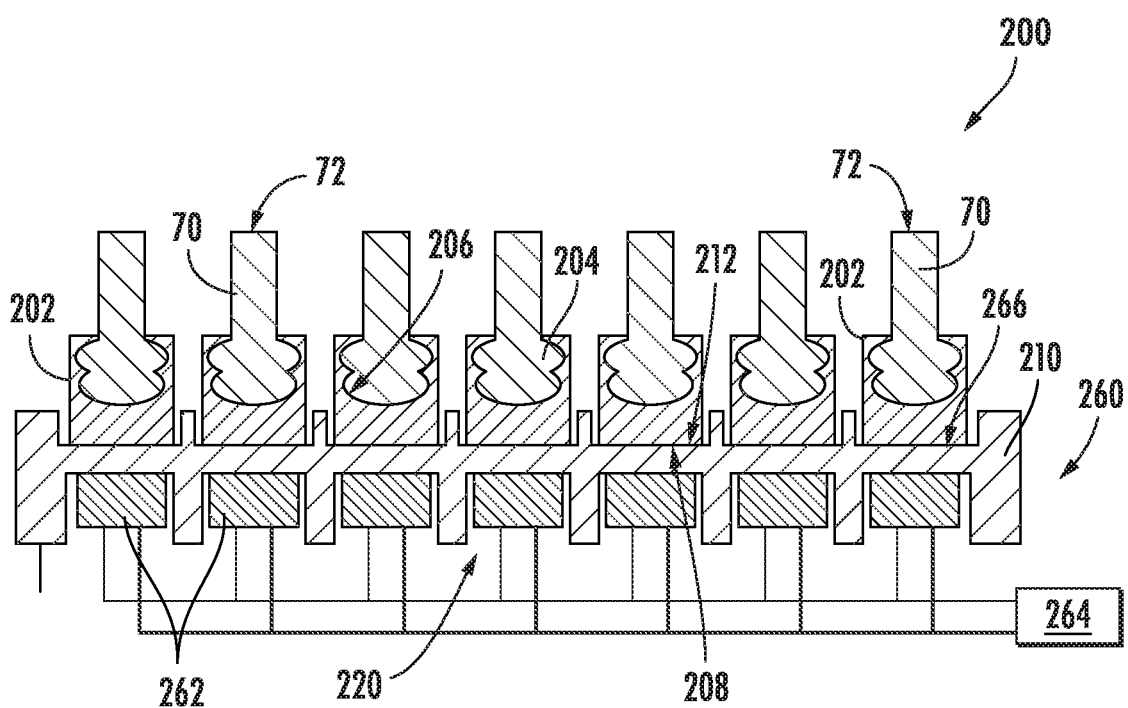
FIG. 10 provides a schematic view of another magnet assembly according to an exemplary embodiment of the present subject matter.

Referring now to FIG. 10, magnet assembly 220 could instead include an electromagnet assembly 260 which is configured for securing component fixtures 202 to mounting plate 210 when energized with electrical current. As used herein, an electromagnet 262 is intended to refer to a type of magnet in which the magnetic field is produced by an electric current. In this regard, electromagnets 262 usually consist of wire wound into a coil which is electrically coupled to a power supply 264. Power supply 264 selectively provides a current through the wire of electromagnet 262 which creates a magnetic field. Although an exemplary electromagnet 262 is described, it should be appreciated that any other suitable type or configuration of electromagnet may be used according to alternative embodiments.

According to the illustrated embodiment, component fixture 202 may include an embedded magnet or may be formed from a magnetic material, such that electromagnet 262 attracts component fixture 202 when energized. Notably, according to exemplary embodiments, electromagnet 262 attracts component fixtures 202 toward mounting plate 210, but may not facilitate appropriate alignment or orientation of such component fixtures 202. Thus, according to an exemplary embodiment, mounting plate 210 may define a plurality of recesses 266 which may be configured for receiving component fixtures 202 and preventing rotation thereof. In this manner, a plurality of blades 70 may be positioned in the desired alignment on mounting plate 210 by positioning component fixtures 202 on mounting plate within recesses 266 and energizing electromagnet 262 using power supply 264. Moreover, when the additive manufacturing process is complete, electromagnet 262 may be deenergized for easy removal of component fixtures 202.

Now that the construction and configuration of additive repair system 50 has been described according to exemplary embodiments of the present subject matter, an exemplary method 300 for mounting a plurality of components for a repair or rebuild process using an additive repair system will be described according to an exemplary embodiment of the present subject matter. Method 300 can be used to repair blades 70 using additive repair system 50, AM machine 100, and tooling assembly 200, or to repair any other suitable component using any other suitable additive manufacturing machine or system. In this regard, for example, controller 60 may be configured for implementing some or all steps of method 300. Further, it should be appreciated that the exemplary method 300 is discussed herein only to describe exemplary aspects of the present subject matter, and is not intended to be limiting.

Figure 11:
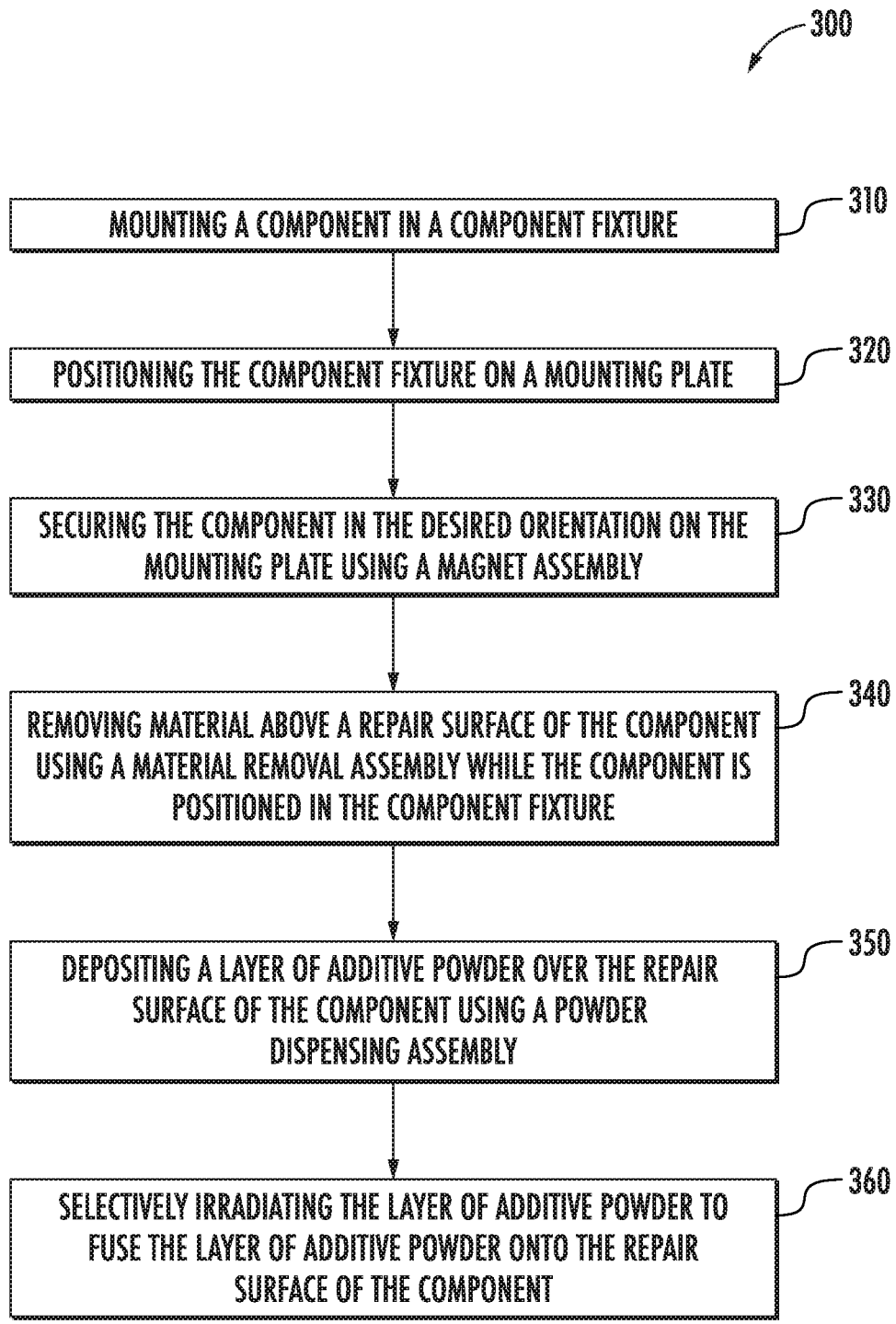
FIG. 11 is a method of mounting a plurality of components in a powder bed additive manufacturing machine according to an exemplary embodiment of the present subject matter.

Referring now to FIG. 11, method 300 includes, at step 310, mounting a component in a component fixture. In this regard, a plurality of blades 70 which need to be repaired may be positioned in corresponding component fixtures 202, e.g., by sliding dovetails 204 of each blade 70 in a complementary slot 206 of each component fixture 202. Step 320 includes positioning the component fixture on a mounting plate. For example, the mounting plate 210 may be a flat plate configured for receipt on build platform 118 of AM machine 100. Alternatively, mounting plate 210 could instead replace build platform 118. Component fixtures 202 may be positioned directly on mounting plate 210.

Step 330 includes securing the component in the desired orientation on the mounting plate using a magnet assembly. As described in detail above, the magnet assembly 200 may include a fixture magnet 222 and plate magnet 224 which have opposing polarities and are positioned within component fixture 202 and mounting plate 210, or vice versa, such that component fixture 202 is urged toward mounting plate and secured thereto. Alternatively, component fixture 202 and mounting plate 210 may each include bar magnets having opposing poles or may each include two separate magnets to create corresponding magnetic fields defining magnetic axes that can be aligned to orient component fixture 202 as desired. According still another embodiment, component fixtures 202 may be secured using electromagnet assembly 260 or any other suitable device for generating a magnetic field or attractive forces between component fixture 202 and mounting plate 210.

Step 340 may include removing material above a repair surface of the component using a material removal assembly while the component is positioned in the component fixture. In this regard, after all blades 70 are positioned and oriented as desired on mounting plate 210, material removal assembly 54 may be operated to remove the tip of each blade 70 down to repair surface 72. According to alternative embodiments, each blade 70 may be prepared, e.g., by grinding, prior to mounting in component fixture 202 and/or on to mounting plate 210.

According to an exemplary embodiment, method 300 may further include additively printing repair segments onto repair surface 72 of each blade 70 using AM machine 100. In this regard, step 350 includes depositing a layer of additive powder over repair surface of the component using a powder dispensing assembly and step 360 includes selectively irradiating the layer of additive powder to fuse the layer of additive powder onto the repair surface of the component. In this manner, an energy source may fuse additive powder onto each blade tip layer by layer until the component is repaired to an original CAD model or to another suitable geometry.

FIG. 11 depicts an exemplary control method having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using additive repair system 50, AM machine 100, and tooling assembly 200 as an example, it should be appreciated that these methods may be applied to repairing or rebuilding any other number, type, and configuration of components using any suitable tooling fixture or additive manufacturing machine or system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A tooling assembly for mounting a component in a powder bed additive manufacturing machine comprising a build platform, the tooling assembly comprising:
    a component fixture configured for receiving the component;
    a mounting plate configured for receiving the component fixture, the mounting plate being a separate entity from the build platform; and
    a magnet assembly operably coupling the mounting plate to the component fixture for securing the component fixture to the mounting plate in a fixed orientation, the magnet assembly comprising a fixture magnet and a plate magnet, the fixture magnet and the plate magnet being shaped to create an unbalanced geometry.

2. The tooling assembly of claim 1, wherein the magnet assembly further comprises:
    the fixture magnet mounted to the component fixture; and
    the plate magnet mounted to the mounting plate, the fixture magnet and the plate magnet having opposing magnetic poles such that the component fixture is urged toward the mounting plate.

3. The tooling assembly of claim 2, wherein the fixture magnet and the plate magnet have a non-circular geometry.

4. The tooling assembly of claim 2, wherein the fixture magnet and the plate magnet are substantially circular and have a single protrusion to create an unbalanced geometry.

5. The tooling assembly of claim 1, wherein the magnet assembly further comprises:
    the fixture magnet comprising a first fixture magnet and a second fixture magnet, the first fixture magnet and the second fixture magnet being mounted to the component fixture and being spaced apart along a fixture magnetic axis; and the plate magnet comprising a first plate magnet and a second plate magnet, the first plate magnet and the second plate magnet being mounted to the mounting plate and being spaced apart along a plate magnetic axis, and wherein the first fixture magnet and the first plate magnet have opposing magnetic poles and the second fixture magnet and the second plate magnet have opposing magnetic poles such that the component fixture is urged toward the mounting plate such that the fixture magnetic axis is substantially parallel to the plate magnetic axis.

6. The tooling assembly of claim 1, wherein the component fixture comprises a magnetic material and wherein the magnet assembly further comprises:
an electromagnet electrically coupled to a power supply for selectively generating a magnetic field that urges the component fixture toward the mounting plate.

7. The tooling assembly of claim 6, wherein the mounting plate defines a recess for receiving the component fixture.

8. The tooling assembly of claim 1, further comprising:
a material removal assembly for removing material above a repair surface of the component while positioned in the component fixture.

9. The tooling assembly of claim 1, wherein the tooling assembly is configured for supporting the component during a subsequent additive manufacturing repair process, the additive manufacturing repair process comprising:
depositing a layer of additive powder over a repair surface of the component using a powder dispensing assembly; and
selectively irradiating the layer of additive powder to fuse the layer of additive powder onto the repair surface of the component.

10. The tooling assembly of claim 1, wherein the component is one of a plurality of components and the component fixture is one of a plurality of component fixtures, each of the plurality of component fixtures being configured for receiving one of a plurality of components, wherein the mounting plate is configured for receiving the plurality of component fixtures, and wherein the magnet assembly operably couples the mounting plate to the plurality of component fixtures for securing the plurality of component fixtures to the mounting plate in a fixed orientation.

11. The tooling assembly of claim 10, wherein the plurality of components comprises at least one airfoil of a gas turbine engine.

12. The tooling assembly of claim 10, wherein each of the plurality of components is an airfoil of a gas turbine engine having a chord line, and wherein the plurality of components are in the fixed orientation when the chord line of each of the plurality of components are parallel.

13. A method of mounting a component in a powder bed additive manufacturing machine comprising a build platform, the method comprising:
mounting the component in a component fixture;
positioning the component fixture on a mounting plate, the mounting plate being a separate entity from the build platform; and
securing the component in a fixed orientation on the mounting plate using a magnet assembly, the magnet assembly comprising a fixture magnet and a plate magnet, the fixture magnet and the plate magnet being shaped to create an unbalanced geometry.

14. The method of claim 13, wherein the magnet assembly further comprises:
the fixture magnet mounted to the component fixture; and
the plate magnet mounted to the mounting plate, the fixture magnet and the plate magnet having opposing magnetic poles such that the component fixture is urged toward the mounting plate.

15. The method of claim 13, wherein the magnet assembly further comprises:
the fixture magnet comprising a first fixture magnet and a second fixture magnet, the first fixture magnet and the second fixture magnet being mounted to the component fixture and being spaced apart along a fixture magnetic axis; and
the plate magnet comprising a first plate magnet and a second plate magnet, the first plate magnet and the second plate magnet being mounted to the mounting plate and being spaced apart along a plate magnetic axis, and
wherein the first fixture magnet and the first plate magnet have opposing magnetic poles and the second fixture magnet and the second plate magnet have opposing magnetic poles such that the component fixture is urged toward the mounting plate such that the fixture magnetic axis is substantially parallel to the plate magnetic axis.

16. The method of claim 13, wherein the component fixture comprises a magnetic material and wherein securing the component in the fixed orientation on the mounting plate using the magnet assembly comprises:
selectively generating a magnetic field using an electromagnet electrically coupled to a power supply to urge the component fixture toward the mounting plate.

17. The method of claim 13, further comprising:
removing material above a repair surface of the component using a material removal assembly while the component is positioned in the component fixture.

18. The method of claim 13, further comprising:
depositing a layer of additive powder over a repair surface of the component using a powder dispensing assembly; and
selectively irradiating the layer of additive powder to fuse the layer of additive powder onto the repair surface of the component.

19. The method of claim 13, wherein the component is one of a plurality of components and the component fixture is one of a plurality of component fixtures, each of the plurality of component fixtures being configured for receiving one of a plurality of components, wherein the mounting plate is configured for receiving the plurality of component fixtures, and wherein the magnet assembly operably couples the mounting plate to the plurality of component fixtures for securing the plurality of component fixtures to the mounting plate in a fixed orientation.

20. The method of claim 19, wherein each of the plurality of components is an airfoil of a gas turbine engine having a chord line, and wherein the plurality of components are in the fixed orientation when the chord line of each of the plurality of components are parallel.

21. A tooling assembly for mounting a component in a powder bed additive manufacturing machine, the tooling assembly comprising:
a component fixture configured for receiving the component;
a mounting plate configured for receiving the component fixture; and a magnet assembly operably coupling the mounting plate to the component fixture for securing the component fixture to the mounting plate in a fixed orientation, the magnet assembly comprising a fixture magnet and a plate magnet, the fixture magnet and the plate magnet being shaped to create an unbalanced geometry.

* * * * *